(12) United States Patent
Schaefer et al.

(10) Patent No.: US 6,594,663 B2
(45) Date of Patent: *Jul. 15, 2003

(54) METHOD AND APPARATUS FOR IMPLEMENTING AND MAINTAINING A CONFIGURATION DATABASE

(75) Inventors: Joseph A. Schaefer, Olympia, WA (US); Michael F. Kartoz, Tumwater, WA (US); Robert L. Huff, University Place, WA (US); Kimberly A. Davis, University Place, WA (US); Kirk Brannock, Olympia, WA (US); Donald Hewett, University Place, WA (US); William J. Chalmers, Olympia, WA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/475,440

(22) Filed: Dec. 30, 1999

(65) Prior Publication Data

US 2003/0088535 A1 May 8, 2003

(51) Int. Cl.[7] ............................................. G06F 17/30
(52) U.S. Cl. ............................................. 707/10; 707/9
(58) Field of Search .................. 707/9, 103 R, 707/200, 203, 10, 205; 345/854; 713/2

(56) References Cited

U.S. PATENT DOCUMENTS

| | | |
|---|---|---|
| 5,113,512 A | 5/1992 | Miki et al. |
| 5,247,659 A | 9/1993 | Curran et al. .................. 713/1 |
| 5,355,489 A | 10/1994 | Bealkowski et al. ........... 713/2 |
| 5,519,843 A | 5/1996 | Moran et al. |
| 5,615,331 A | 3/1997 | Toorians et al. |
| 5,835,594 A | 11/1998 | Albrecht et al. ............. 713/187 |
| 5,860,083 A | 1/1999 | Sukegawa |
| 5,930,504 A | 7/1999 | Gabel ............................. 713/2 |
| 5,937,434 A | 8/1999 | Hasbun et al. |
| 5,974,546 A | 10/1999 | Anderson ....................... 713/2 |
| 6,018,806 A | 1/2000 | Cortopassi et al. |
| 6,026,402 A * | 2/2000 | Vossen et al. .................. 707/9 |
| 6,032,239 A | 2/2000 | Beelitz |
| 6,101,601 A | 8/2000 | Matthews et al. ............. 713/2 |
| 6,119,131 A * | 9/2000 | Cabrera et al. ............. 707/203 |
| 6,138,239 A | 10/2000 | Veil ............................ 713/200 |
| 6,148,441 A | 11/2000 | Woodward |
| 6,185,678 B1 | 2/2001 | Arbaugh et al. ............... 713/2 |
| 6,192,471 B1 * | 2/2001 | Pearce et al. .................. 713/2 |
| 6,256,031 B1 * | 7/2001 | Meijer et al. ............... 345/357 |
| 6,308,264 B1 | 10/2001 | Rickey |
| 6,308,265 B1 | 10/2001 | Miller ........................... 713/2 |
| 6,378,128 B1 | 4/2002 | Edelstein et al. ........... 717/174 |
| 6,401,202 B1 | 6/2002 | Abgrall |
| 6,401,208 B2 | 6/2002 | Davis et al. |
| 6,430,481 B1 | 8/2002 | Lovelace, II et al. ......... 701/19 |
| 6,446,201 B1 | 9/2002 | Gunther |

FOREIGN PATENT DOCUMENTS

JP        411039152 A        2/1999

OTHER PUBLICATIONS

Jerry Jex, *Flash Memory BIOS for PC and Notebook Computers,* May 9–10, 1991, pp. 692–695.

* cited by examiner

*Primary Examiner*—Diane D. Mizrahi
(74) *Attorney, Agent, or Firm*—Blakely, Sokoloff, Taylor & Zafman LLP

(57) ABSTRACT

In one embodiment, the invention is an apparatus. The apparatus includes a first d-node having a pointer to a subordinate d-node and an identifier. The apparatus also includes a set of d-nodes, each d-node of the set of d-nodes having an identifier, a pointer to a peer d-node, a pointer to a subordinate d-node and a pointer to an entry. The set of d-nodes is accessible through the pointer of the first d-node. The apparatus also includes a set of entries, each entry of the set of entries having an identifier, a type, a value, and a pointer to an entry. The value of each entry embodies data corresponding to a configuration of a system.

21 Claims, 5 Drawing Sheets

METHOD AND APPARATUS FOR IMPLEMENTING AND MAINTAINING A CONFIGURATION DATABASE

BACKGROUND OF THE INVENTION

1. Field of the Invention

The invention generally relates to storage of system data and more particularly relates to storage of BIOS (built in operating system) data.

2. Description of the Related Art

When a computer system starts up, typically it first runs instructions on the processor(s) which are stored in a BIOS (built in operating system). These instructions may initialize the system and may help the system determine how it is configured and how it may operate. The code stored in a BIOS is typically written at a very low level, assembly language is typically the language of choice. As a result, instructions and data are often interwoven, such that determining what the code does and what the state of the system should be during or after execution of the code requires attention to fine details of the code.

This leads to difficulty in determining whether the code in the BIOS is written properly, and may lead to problems in diagnosing errors or failures in a computer system utilizing the BIOS. Additionally, this leads to difficulty in adjusting BIOS code. Without a unifying structure in place, a programmer assigned the task of changing the BIOS code to configure a computer system in a different way may need to comb through the entire BIOS code to verify that all variables or values are properly adjusted. It is not uncommon for BIOS code in current systems to occupy memory space on the order of 1 MB in size, so sifting through an entire BIOS may not be dismissed as a trivial task. Unfortunately, overlooking even one parameter in the startup of a system may lead to unpredictable performance of the system at a later time, and that unpredictable performance may not be obviously attributable to a problem in the startup configuration of the system.

Furthermore, validating the configuration of a system may likewise prove difficult when the information describing the condition of the system at startup is difficult to obtain. This may easily result when the data and instructions manipulating the data are intermingled as they often are in a BIOS. Thus, someone attempting to discover the state of a computer system by determining what the configuration parameters of a computer system were set to when the system started operating would be frustrated in their attempts to obtain this information. Again, the sheer size of the BIOS would make this a difficult and expensive task.

SUMMARY OF THE INVENTION

In one embodiment, the invention is an apparatus. The apparatus includes a first d-node having a pointer to a subordinate d-node and an identifier. The apparatus also includes a set of d-nodes, each d-node of the set of d-nodes having an identifier, a pointer to a peer d-node, a pointer to a subordinate d-node and a pointer to an entry. The set of d-nodes is accessible through the pointer of the first d-node. The apparatus also includes a set of entries, each entry of the set of entries having an identifier, a type, a value, and a pointer to an entry. The value of each entry embodies data corresponding to a configuration of a system.

BRIEF DESCRIPTION OF THE DRAWINGS

The present invention is illustrated by way of example and not limitation in the accompanying figures.

DETAILED DESCRIPTION

A method and apparatus for implementing and maintaining a configuration database is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
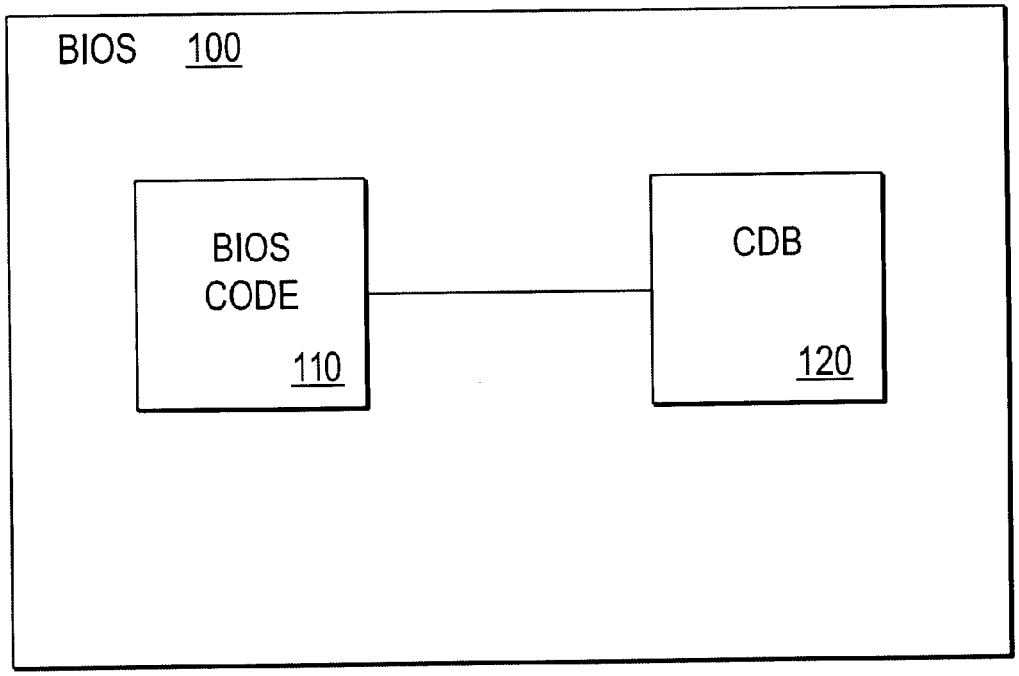
FIG. 1 illustrates an embodiment of a BIOS (built in operating system).

Illustrated in FIG. 1 is an embodiment of a BIOS 100 containing BIOS code 110 and a CDB (configuration database) 120. In one embodiment, the BIOS code 110 implements functions of the BIOS, such as discovering and configuring the surrounding computer system for example. The CDB 120 contains the values used to configure the system or the values representing the presence of various devices or components within the system. Thus, examination of values within the CDB 120 may provide an indication of how the system is configured or whether the BIOS code 110 functions properly when executed on a processor in the system.

Figure 2:
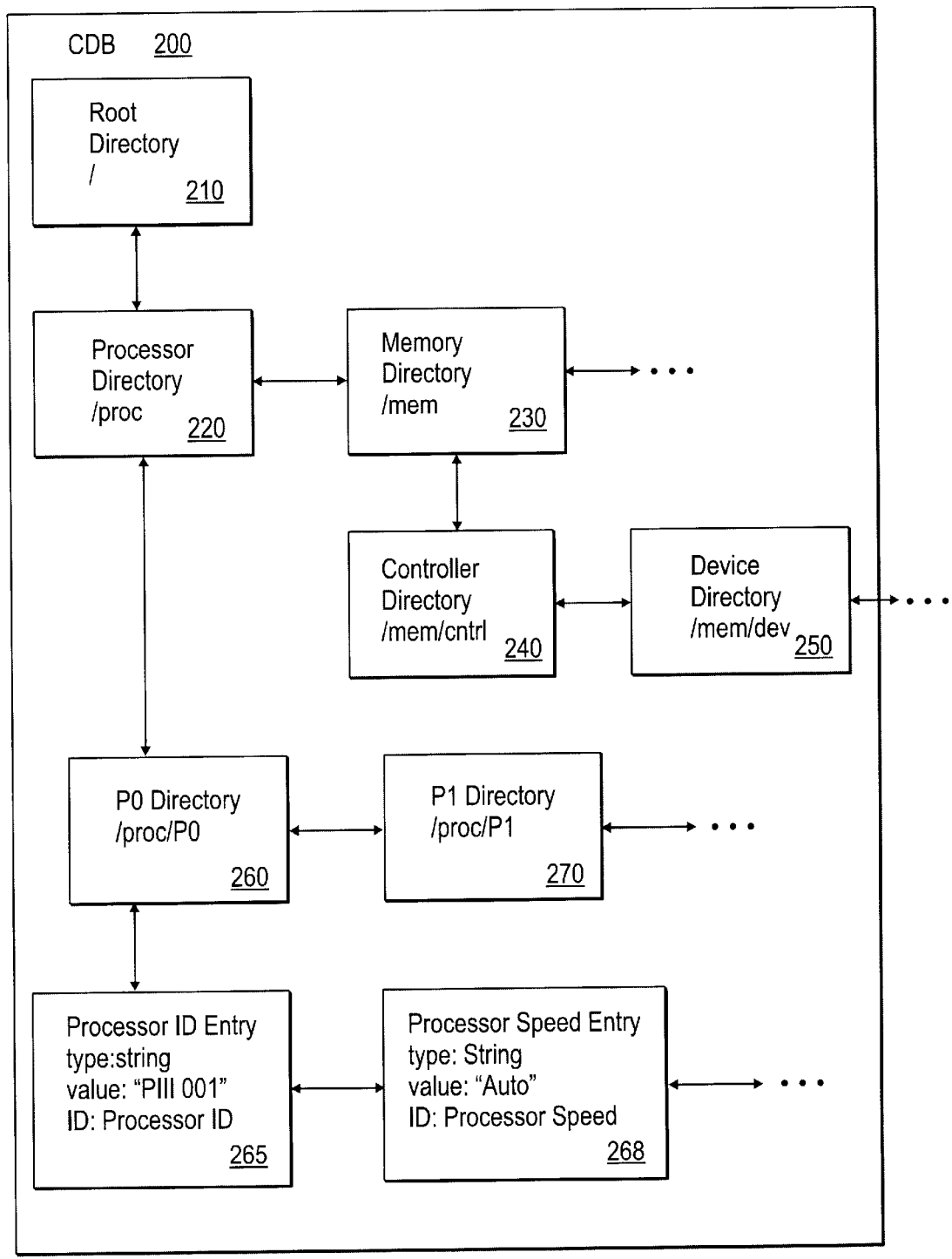
FIG. 2 illustrates an embodiment of a configuration database.

Turning to FIG. 2, one embodiment of a CDB is illustrated. CDB 200 is made up of a structure of d-nodes (directories) and entry nodes. Each d-node has an identifier, a pointer to subordinate d-nodes (or subdirectories), a pointer to peer d-nodes, and a pointer to any entry nodes associated with the directory. Each entry has a pointer to additional entries associated with a directory, an identifier, a type of data, and the data stored therein or pointed to. In the embodiment illustrated, root directory 210 is at the logical top of the hierarchy, and only contains a pointer to subordinate d-node processor directory 220. Note that each d-node is shown with a path (such as '/' of root directory 210 for example) which indicates the path used to traverse from the root directory 210 to the d-node in question. Note also that the pointers all illustrate a pair of pointers, one pointer in a first d-node or entry pointing to a second d-node or entry and one pointer in the second d-node or entry pointing to the first d-node or entry. This feature allows for navigation through the structure from one point to another rather than requiring navigation to start at the root 210 d-node each time a different entry or d-node is sought.

Processor directory 220 contains a pointer to a peer d-node for memory directory 230 and a pointer to a subordinate d-node for P0 directory 260. The path to processor directory 220 is '/proc' and 'proc' may be thought of as the identifier for processor directory 220. Memory directory 230 contains a pointer to a peer d-node (the peer d-node is not shown), a pointer to a subordinate d-node for controller directory 240, and the identifier 'mem' as exemplified by the illustrated '/mem'. Controller directory 240 contains an identifier 'cntlr' exemplified by the illustrated path '/mem/cntlr' and a pointer to a peer d-node for device directory 250. Device directory 250 contains an identifier 'dev' and a pointer to a peer d-node for a d-node which is not shown.

P0 directory 260 contains the identifier 'P0', a pointer to a peer d-node for P1 directory 270, and a pointer to an entry for processor ID entry 265. Processor ID entry 265 contains a type indicating what type of entry is stored (a string in this instance), a value which holds the value of the entry ('PIII001' in this instance), an ID indicating the identification of the entry ('Processor ID' in this instance) and a pointer to another entry for processor speed entry 268. Processor speed entry 268 contains a type indicating what type of entry is stored (a string in this instance), a value which holds the value of the entry ('Auto' in this instance), an ID indicating the identification of the entry ('Processor Speed' in this instance), and a pointer to another entry which is not shown.

It will be appreciated that any d-node may have a pointer to a peer d-node, a subordinate d-node, an entry, or a combination of all three. Likewise, any entry may have a pointer to another entry. Each d-node and each entry has an identifier. Also, each entry has a type which may, in one embodiment, be either a string, string-multi (multiple strings), a doubleword, or a binary object (a collection of binary data with no restrictions on size). Likewise, each entry has a value corresponding to the type of the entry, and in the case of a binary object there will also be a specification of the size of the binary object.

In one embodiment, navigation within the CDB and setting and retrieving values from the CDB may be done with a set of functions similar to those familiar for navigating through directory structures in file systems. To begin with, a pointer to something within the CDB must be available. In one embodiment, a pointer to the root directory d-node of the CDB is always maintained as well. To move to a new directory, a cdbsetCWD (CWD—current working directory) function may be used. When supplied with the absolute path to the desired location or a relative path from the current location to the desired location, along with the current location, the cdbsetCWD function returns a pointer to the desired location if the supplied pathname was correct. In one embodiment, the parent d-node is defined as the d-node which has its subordinate d-node pointer pointing to the list of d-nodes in which the current d-node is found, and that parent d-node may be found with the relative path '..' from the current d-node. This allows for navigation from a d-node up the hierarchical structure. Furthermore, each directory identifier is separated by '/' in one embodiment, thus allowing for navigation through multiple directory d-nodes to reach a desired destination. Thus, if one started with a CWD of '/proc/P0' and wanted to move to '/mem' two options would exist for specifying the desired path. First, the absolute path '/mem' could be supplied. Second, the relative path '../../mem' could be supplied.

Likewise, in one embodiment, a value of an entry of the CDB may be obtained using a cdbgetentry function. When supplied a CWD pointer, a path to the entry, and an identifier of the entry, the cdbgetentry function will return a pointer to the specified entry and the type of entry. Similarly, in one embodiment, a cdbsetentry function may be used to set the value of an already existing entry when supplied with a CWD pointer, a path to the entry, an identifier of the entry, the value of the entry and the type of the entry. Also, in one embodiment, a new d-node may be created using a cdbcreated-node function by supplying a path to the new d-node and an identifier for the new d-node. Furthermore, in one embodiment, a cdbcreateentry function may be used to create an entry by supplying a path to the new entry, an identifier for the new entry, a value for the new entry, and a type for the new entry. In one embodiment, cdbcreateentry creates any nonexistent d-nodes necessary to create the path to the new entry. It will be appreciated that similar functions for deleting an entry or d-node may be supplied, such that the structure may be organized and managed in a reasonable manner.

Any entry in a list of entries pointed to by a d-node is considered to reside within that d-node for purposes of navigation. Likewise, any peer d-node of a second d-node pointed to by a first d-node is considered to reside within the first d-node, and any subordinate d-node of the second d-node or peer d-nodes of the second d-node is considered to reside within the first d-node. Thus, anything that resides within a d-node may be found by traversing down from the d-node, there would be no need to move to a peer d-node of the d-node or to a d-node hierarchically above that d-node.

In one embodiment, a CDB initially resides in a non-volatile or persistent memory, such that it may be expected to survive a reset or reboot of a system. However, the CDB may be copied into volatile memory such as RAM and manipulated, and may be copied back into non-volatile memory thereafter. In such an instance, d-nodes and entries created while the CDB is stored in RAM may be tagged with a volatile or non-volatile tag, indicating whether the d-node or entry should be copied when the CDB is copied back into non-volatile storage. When the CDB is used for storing configuration information of a system, some of that information may be deemed too dynamic to be worth saving in non-volatile storage, whereas other information may be sufficiently static that it should be saved.

Figure 3:
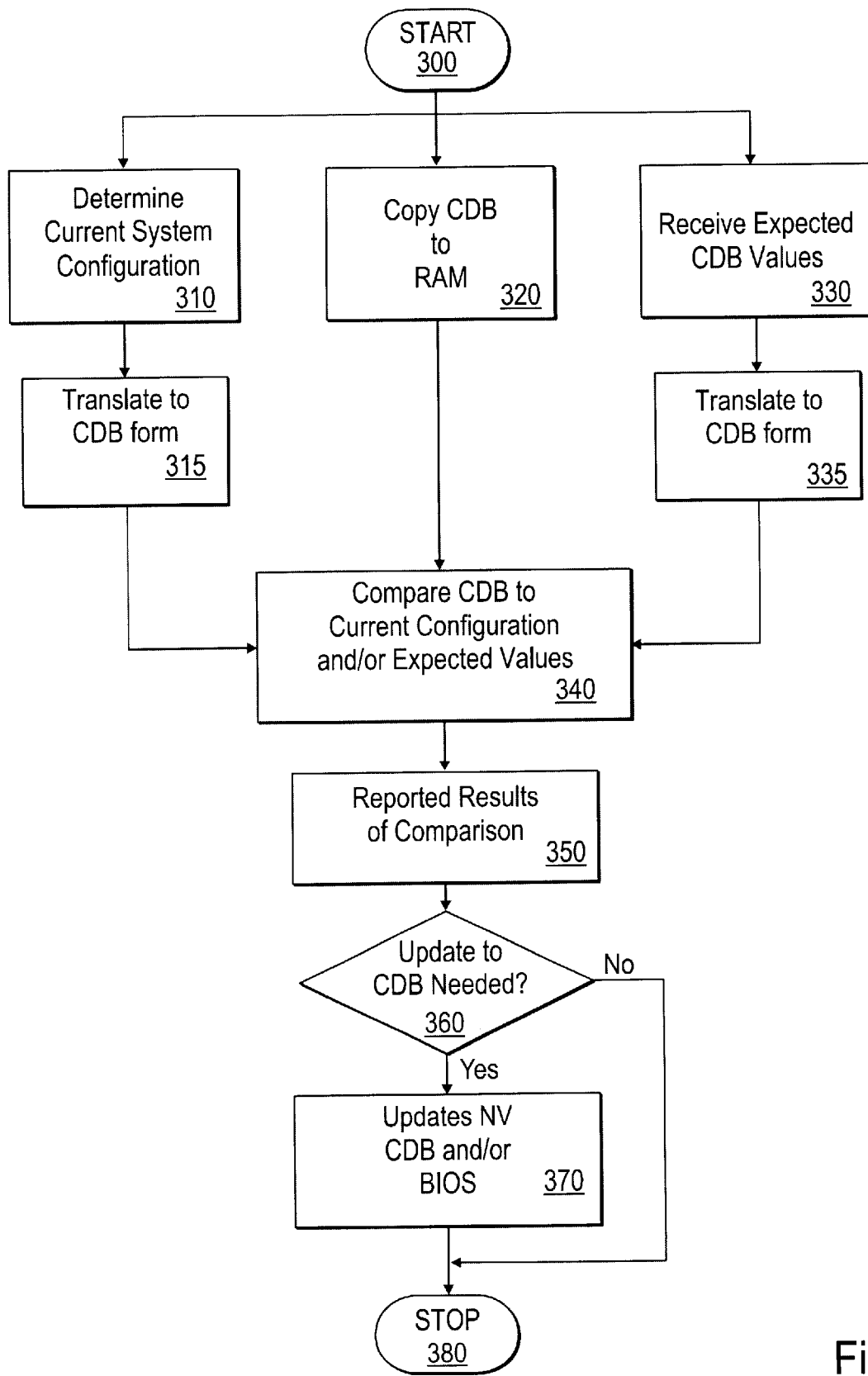
FIG. 3 illustrates an embodiment of a process for comparing a configuration database to other standards for the configuration of a system.

Turning to FIG. 3, a flow diagram of a process of evaluating a system's configuration using a CDB is illustrated. Initially, the process starts at start block 300. Three independent sets of operations branch out from start block 300, and these three sets of operations may occur in a serial or parallel fashion. Furthermore, only two of these sets of operations need occur, as the object is to compare what the startup of the computer yields as a system configuration with an expected or actual configuration. At block 310, the current system configuration is determined, either by polling the parts of the system or by otherwise examining the system, typically through use of software similar to that used by the BIOS to evaluate the system at startup. If necessary, block 315 involves transforming the current system configuration into a CDB form, by creating a d-node and entry structure along the lines of that outlined with respect to FIG. 2. At block 320, the CDB as developed and maintained by the BIOS is copied to RAM or some form of randomly accessible storage. At block 330, the expected values of the CDB are obtained, and this may occur by having a person who has evaluated the system enter these values in some manner, or by using a copy of an earlier generated CDB. At block 335, the expected CDB values are transformed into a CDB form if necessary.

In one embodiment, a CM (configuration manager) is used to copy the CDB to RAM, to check the current configuration of the system, and to receive the expected configuration from the operator. The CM is a software tool using the functions described with respect to FIG. 2 to maintain and manipulate the CDB, and is designed with a user interface allowing a user to determine what the current configuration of the system is. It will be appreciated that the CM may be implemented in a manner that is highly dependent on the underlying system, and that while some aspects of the CM may be generic, most aspects of the CM will thus be system-dependent.

At block 340, the results of all three independent operations are compared, thus making a determination as to whether the current system configuration, the expected system configuration and the startup system configuration match. The results of this comparison are reported at block 350, and a decision may be made either by a software algorithm or an operator of the system as to whether the CDB needs to be updated at block 360. If it is determined that the CDB needs to be updated, then at block 370 changes are made in the CDB stored in randomly accessible storage, and the CDB is then copied back to the non-volatile storage where it originally resided and where it is maintained by the BIOS. After processing at block 370, or at block 360 if no changes were necessary, the process stops at termination block 380.

It will be appreciated that this process of comparing the CDB maintained by the system with either an expected configuration of the system or a dynamically determined configuration of the system may yield much useful information about the system. It may become apparent that the BIOS is not properly initializing the system or discovering all of the components of the system at startup. It may also become apparent that other software besides the BIOS is altering the configuration of the system, either in the CDB, or without updating the CDB. Furthermore, it may become apparent that portions of the system are malfunctioning or not performing as predicted. All of this information may prove useful in debugging a system, designing a new system, or verifying the proper performance of a system.

Also, it will be appreciated that the process of constructing a CDB or CDB form for information may be executed using the data structures and functions described previously with respect to FIG. 2, as the data structure may be created, traversed, and compared using the functions mentioned. As a result, an automated comparison of the expected, actual, and startup values for the configuration of the system may be made in a straightforward manner, and the differences between two or three CDB structures may be reported in a manner useful for human or automated interpretation.

Figure 4:
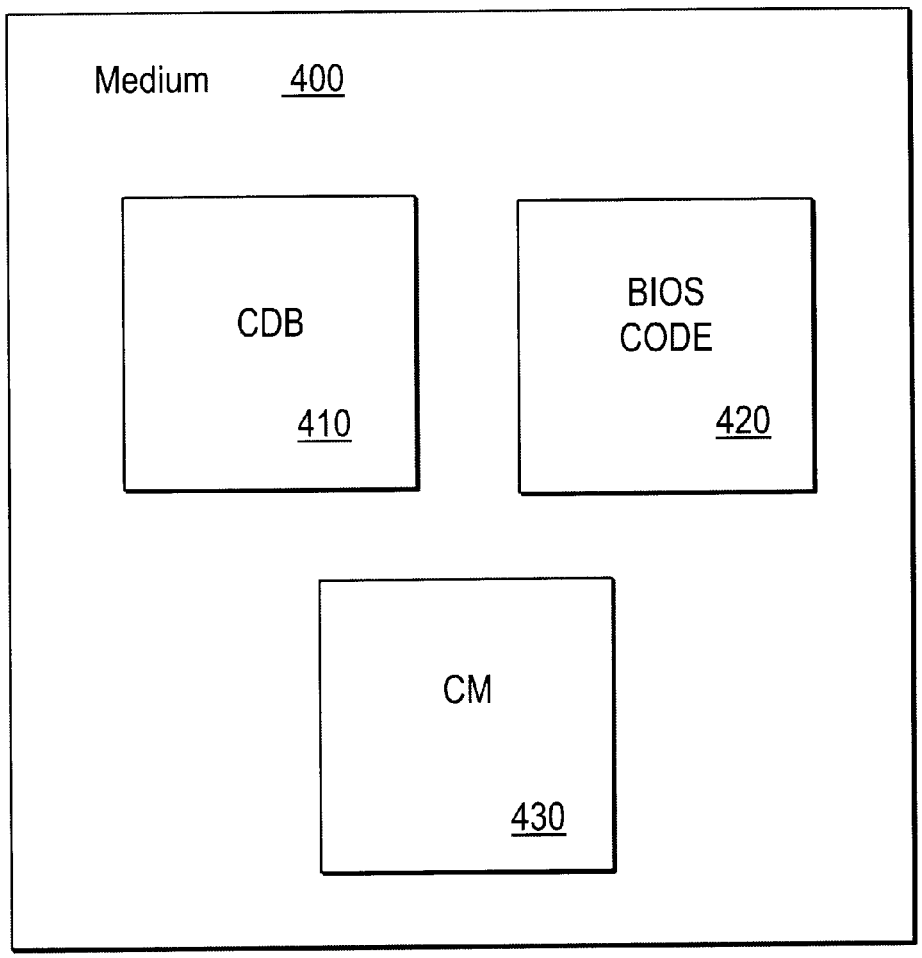
FIG. 4 illustrates a medium embodying a configuration database.

Turning to FIG. 4, a medium embodying instructions and data which when read or executed may represent, create and manipulate a CDB is illustrated. Medium 400 is a machine readable medium or media such as a random access or read-only memory, a magnetic storage medium such as a tape or disc, an optical storage medium such as a compact disc, or a carrier wave among other possibilities. Embodied within medium 400 is a CDB 410 such as the CDB described with respect to FIG. 2. Also embodied within medium 400 is BIOS code 420 which may or may not need to be present concurrently with the CDB 410. BIOS code 420 may, in one embodiment, be the code which makes up the built in operating system of a system. Also embodied within medium 400 is CM 430, a configuration manager suitable for creating and maintaining CDB 410. It will be appreciated that in one embodiment the configuration manager 430 and the BIOS code 420 may be intermingled or otherwise combined to form a single set of code. However, it will be appreciated that in alternative embodiments the BIOS code 420 is composed of code written only in a low-level language such as assembly, whereas the CM 430 is composed of code written in a high-level language such as C, and that both the BIOS code 420 and the CM 430 may access, manipulate and maintain the CDB 410.

Figure 5:
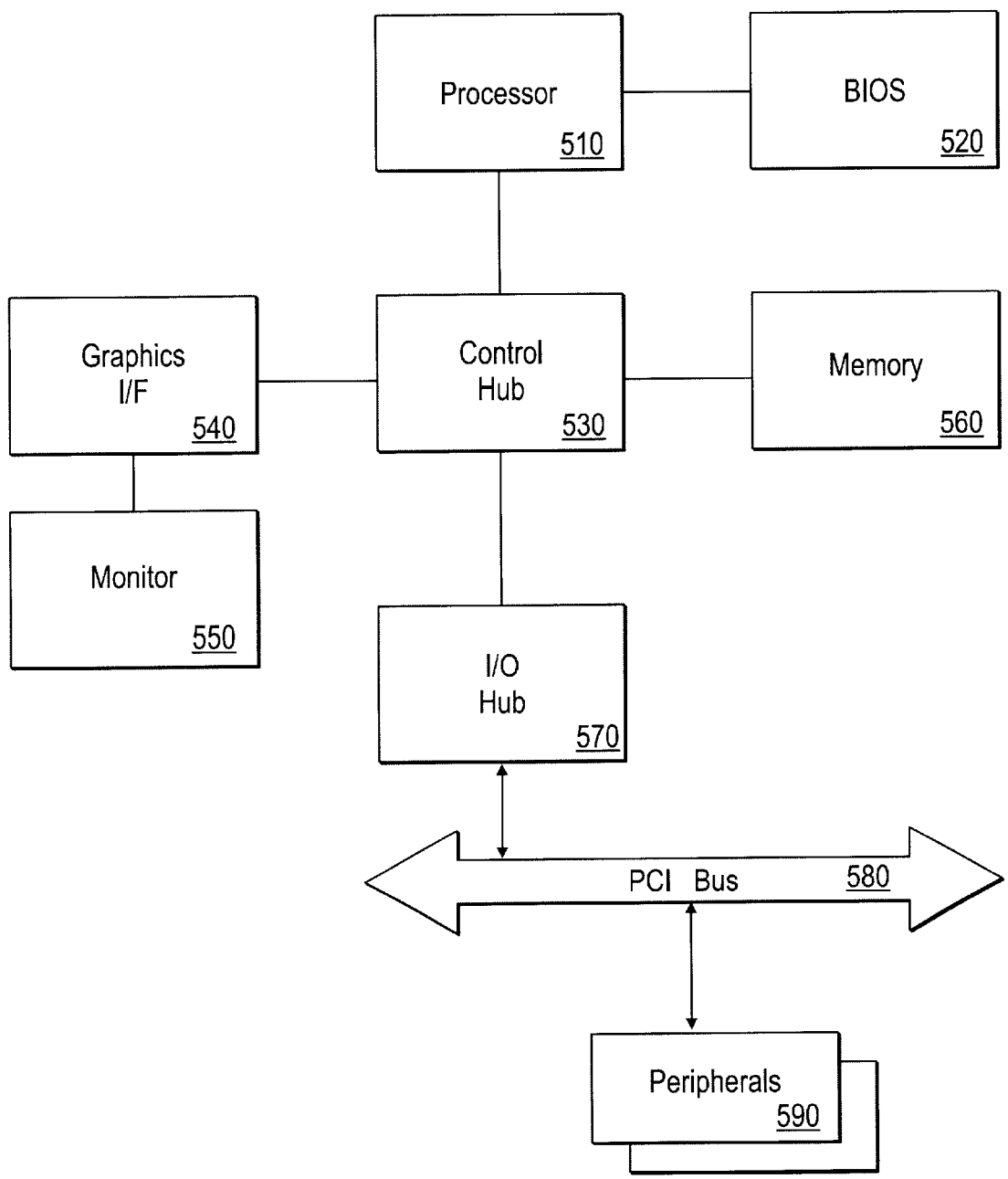
FIG. 5 illustrates an embodiment of a system suitable for making and using a configuration database and register scan process.

Turning to FIG. 5, a system suitable for use with the CDB is illustrated. Processor 510 is coupled to BIOS 520 and to control hub 530. control hub 530 is coupled to memory 560, to i/o hub 550, and to graphics interface 540. Graphics interface 540 is coupled to monitor 550. I/O Hub 570 is coupled to PCI bus 580, which in turn is coupled to peripherals 590. It will be appreciated that many other systems may have different arrangements of different components and still be suitable for use with the CDB.

In one embodiment, the CDB will be stored as part of the BIOS 520 and may also be copied into (shadowed) in the memory 560. If will be appreciated that the shadow CDB in memory 560 may differ from the CDB in the BIOS 520 as well.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A computer-readable medium having stored thereon a data structure, the data structure comprising:

a first d-node having a pointer to a subordinate d-node and an identifier; and a set of d-nodes, each d-node of the set of d-nodes having an identifier, a pointer to a peer d-node, a pointer to a subordinate d-node and a pointer to an entry, the set of d-nodes accessible through the pointer of the first d-node; and a set of entries, each entry of the set of entries having an identifier, a type, a value, and a pointer to an entry, the value of each entry embodying data corresponding to a configuration of a system as represented in a BIOS.

2. The medium of claim 1 wherein:

the d-nodes organized in a directory structure having subordinate d-nodes grouped together below a d-node with a subordinate pointer pointing to one of the subordinate d-nodes and having peer d-nodes grouped together below a d-node with a subordinate pointer pointing to one of the peer d-nodes.

3. The medium of claim 2 wherein:

the type consists of one of the set of a string, a set of strings, a doubleword, and a binary large object.

4. A computer-readable medium embodying a BIOS, the BIOS comprising:

BIOS code; and a configuration database having a first d-node having a pointer to a subordinate d-node and an identifier; and a set of d-nodes, each d-node of the set of d-nodes having an identifier, a pointer to a peer d-node, a pointer to a subordinate d-node and a pointer to an entry, the set of d-nodes accessible through the pointer of the first d-node; and a set of entries, each entry of the set of entries having an identifier, a type, a value, and a pointer to an entry, the value of each entry embodying data corresponding to a configuration of a system represented in the BIOS.

5. The medium of claim 4 wherein the BIOS further comprises:
a configuration manager having functions suitable for maintaining, creating, and manipulating the configuration database.

6. The medium of claim 5 wherein:
the d-nodes organized in a directory structure having subordinate d-nodes grouped together below a d-node with a subordinate pointer pointing to one of the subordinate d-nodes and having peer d-nodes grouped together below a d-node with a subordinate pointer pointing to one of the peer d-nodes.

7. The medium of claim 6 wherein:
the type consists of one of the set of a string, a set of strings, a doubleword, and a binary large object.

8. The medium of claim 4 wherein the medium is a persistent storage medium.

9. A method executable by a processor as a set of instructions, the instructions causing the processor to perform the method comprising:
creating a structure of d-nodes, subordinate d-nodes and entries, the subordinate d-nodes depending from d-nodes or subordinate d-nodes, the entries depending from d-nodes or subordinate d-nodes; and
setting values and identities of entries, the values and identities corresponding to a configuration of a system represented in a BIOS.

10. The method of claim 9 wherein:
setting values and identities of entries includes setting the values to values of BIOS variables and setting the identities to identifiers of BIOS variables.

11. The method of claim 10 wherein:
the d-nodes have pointers to subordinate d-nodes; and
the subordinate d-nodes have pointers to peer d-nodes, to subordinate d-nodes, and to entries.

12. The method of claim 11 further comprising:
retrieving the value of an entry.

13. The method of claim 12 wherein:
a reference to an entry including the identity of the entry combined with a path through the structure to a d-node having the entry;
retrieving including traversing the structure along the path of the reference and searching entries of the d-node having the entry for the entry.

14. A machine readable medium embodying instructions which, when executed by a processor, cause the processor to perform a method, the method comprising:
creating a structure of d-nodes, subordinate d-nodes and entries, the subordinate d-nodes depending from d-nodes or subordinate d-nodes, the entries depending from d-nodes or subordinate d-nodes;
setting values and identities of entries; and
setting values and identities of entries includes setting the values to values of BIOS variables and setting the identities to identifiers of BIOS variables.

15. The machine readable medium of claim 14 further embodying instructions which, when executed by a processor, cause the processor to perform a method, the method further comprising:
the d-nodes have pointers to subordinate d-nodes; and
the subordinate d-nodes have pointers to peer d-nodes, to subordinate d-nodes, and to entries.

16. The machine readable medium of claim 15 further embodying instructions which, when executed by a processor, cause the processor to perform a method, the method further comprising:
retrieving the value of an entry.

17. The machine readable medium of claim 16 further embodying instructions which, when executed by a processor, cause the processor to perform a method, the method further comprising:
a reference to an entry including the identity of the entry combined with a path through the structure to a d-node having the entry;
retrieving including traversing the structure along the path of the reference and searching entries of the d-node having the entry for the entry.

18. A system comprising:
a processor;
a memory control hub coupled to the processor;
a memory coupled to the memory control hub;
a persistent storage medium embodying a BIOS coupled to the processor, the BIOS having:
BIOS code; and
a configuration database having
a first d-node having a pointer to a subordinate d-node and an identifier; and
a set of d-nodes, each d-node of the set of d-nodes having an identifier, a pointer to a peer d-node, a pointer to a subordinate d-node and a pointer to an entry, the set of d-nodes accessible through the pointer of the first d-node; and
a set of entries, each entry of the set of entries having an identifier, a type, a value, and a pointer to an entry, the value of each entry embodying data corresponding to a configuration of a system including the BIOS.

19. The system of claim 18 wherein:
the BIOS having a configuration manager having functions suitable for maintaining, creating, and manipulating the configuration database.

20. The system of claim 19 wherein:
the d-nodes organized in a directory structure having subordinate d-nodes grouped together below a d-node with a subordinate pointer pointing to one of the subordinate d-nodes and having peer d-nodes grouped together below a d-node with a subordinate pointer pointing to one of the peer d-nodes.

21. The system of claim 20 wherein:
the type consists of one of the set of a string, a set of strings, a doubleword, and a binary large object.

* * * * *